March 3, 1959 — E. G. HILL — 2,876,044
DECELERATION RESPONSIVE CONTROLLED BOOSTER BRAKE MECHANISM
Filed June 8, 1955 — 2 Sheets-Sheet 1

INVENTOR.
EDWARD GOVAN HILL
BY John F. Phillips
ATTORNEY

March 3, 1959 E. G. HILL 2,876,044
DECELERATION RESPONSIVE CONTROLLED BOOSTER BRAKE MECHANISM
Filed June 8, 1955 2 Sheets—Sheet 2

INVENTOR.
EDWARD GOVAN HILL
BY
ATTORNEY

2,876,044

DECELERATION RESPONSIVE CONTROLLED BOOSTER BRAKE MECHANISM

Edward Govan Hill, Birmingham, Mich., assignor to Kelsey-Hayes Company, a corporation of Delaware Application June 8, 1955, Serial No. 514,020

5 Claims. (Cl. 303—24)

This invention relates to a booster brake mechanism for motor vehicles and is an improvement over the structure shown in the copending application of David T. Ayers, Jr., and Edward Govan Hill, Serial No. 474,804, filed December 13, 1954.

In the copending application referred to, there has been disclosed a novel booster brake mechanism for motor vehicle, and particularly passenger vehicles, wherein operation of a conventional brake pedal simultaneously effects movement of two fluid displacing plungers one of which displaces fluid to the front wheel cylinders of the motor vehicle and the other of which displaces fluid to the rear wheel cylinders. These plungers are power operated by a fluid pressure motor and the pressure developed by the plunger which displaces fluid into the rear brake cylinders is limited by the power which can be developed by the fluid pressure motor without assistance by the operator through the medium of pedal pressure. On the other hand, the plunger for displacing fluid into the front wheel cylinders is capable of generating hydraulic pressure in accordance with energization of the motor plus whatever force may be added by the operator in depressing the brake pedal.

With such a system, rear wheel brakes are applied to a maximum extent as determined by maximum energization of the booster motor whereas application of the front wheel brakes has no definite limitation except within the limits of the operator, to foot-apply pedal pressure, to add to the force generated by the fluid pressure motor. Such a system constitutes an important advance in the booster brake art. With such a system, the locking and skidding of the rear wheels of a passenger car is much less likely to occur since brake application is limited by booster motor energization. The rear wheels are much more easily locked for the reason that much less weight is supported by the rear wheels and, accordingly, there is less tendency to maintain definite highway traction.

Because of the much greater weight supported by the front wheels of a passenger motor vehicle, it is the general practice to provide sixty percent of the braking action at the front wheels and forty percent at the rear wheels. Since the weight of the vehicle engine is very great and serves to maintain traction between the front wheels of the vehicle and the highway, it is extremely difficult under normal conditions to lock and skid the front wheels.

In the copending application, therefore, front wheel brake application occurs through energization of the booster motor plus whatever force may be added by the operator, and still the front wheels under normal conditions will not lock and skid. In a conventional passenger car braking system, where a brake pedal is depressed suddenly and to a substantial extent for an emergency stop, it is quite easy to lock and skid the rear wheels of the vehicle, causing the tires to "scream" on the road. When this occurs, the operator usually will not further depress the brake pedal and, in fact, in nearly all instances he will instinctively somewhat release the brake pedal even though he is able to utilize substantially greater front wheel braking effort than has been applied. This instinctive releasing of pedal pressure, of course, is disadvantageous particularly in an emergency, and the structure of the copending application is highly advantageous in that it very much reduces the tendency for the rear vehicle wheels to lock without interfering with maximum brake application at the front wheels. As a matter of fact, since manual effort added to booster motor energization is confined to the front wheels, the operator is enabled to apply much greater braking effort at the front wheels than otherwise would be possible.

While the structure of the copending application referred to operates to limit rear brake application in accordance with maximum booster motor energization, there are times when the rear wheels can be locked even with such an advantageous system. This is due to the fact that when the brake pedal is suddenly and substantially depressed, the front end of the vehicle body dips, as is well known, and this is accompanied by a tendency for the rear end of the vehicle to rise somewhat, thus reducing the weight on the rear vehicle tires and rendering it easier for such tires to be locked so that they skid.

An important object of the present invention is to provide a booster brake mechanism, particularly for passenger vehicles, utilizing all of the advantages of the system disclosed in the copending application referred to and supplementing such system with additional cooperating means tending to prevent the locking and skidding of the rear vehicle wheels, thus eliminating any tendency for the operator to ease up on the brake pedal under emergency stopping conditions.

A further object is to provide such a booster brake mechanism wherein the application of the rear vehicle brakes is limited in accordance with the maximum capacity of the booster motor and wherein the portion of the motor or motors affecting the rear brake cylinders is prevented from or delayed in reaching maximum energization under emergency braking conditions when the rate of vehicle deceleration is above a predetermined point.

A further object is to provide such a booster mechanism wherein, for normal average vehicle stops, the booster motor piston which displaces fluid into the rear brake cylinders can be energized to its maximum extent, and to provide inertia-operated valve means for retarding the energization of the booster motor for applying the rear brakes, thus preventing the locking and skidding of the rear brakes under almost all normal driving conditions when the rate of vehicle deceleration is above a predetermined point.

A further object is to provide a double-ended motor or a pair of motors provided with separate pressure operated pistons for displacing fluid into the front and rear wheel cylinders and wherein the fluid pressures for motor energization are controlled by a single valve mechanism in accordance with pedal operation, and to provide means separate from the control valve mechanism for retarding energization of the motor means for the rear wheel brake cylinders when the rate of vehicle deceleration exceeds a predetermined point.

In a broader aspect, it is an important object of the present invention to provide a mechanism having separate hydraulic connections to the front and rear wheel cylinders of a motor vehicle and through which hydraulic fluid is displaced upon operation of the brake pedal, and to reduce the effectiveness of the transmission of hydraulic fluid to the rear wheel cylinders under extreme braking conditions when the rate of vehicle deceleration exceeds a predetermined point.

Other objects and advantages of the invention will become apparent during the course of the following description.

In the drawings I have shown one embodiment of the invention. In this showing:

Figure 4 is an enlarged fragmentary sectional view on line 4—4 of Figure 1, showing one type of inertia controlled valve mechanism.

In the copending application referred to, the power unit for the mechanism has been shown as comprising a single motor having two pistons operable for displacing fluid to the vehicle wheel cylinders. The same general type of motor is disclosed herein, except for the changes specifically described, but it will become apparent that separate booster motors may be employed for operating the plungers for displacing fluid into the front and rear wheel cylinders.

Figure 1:
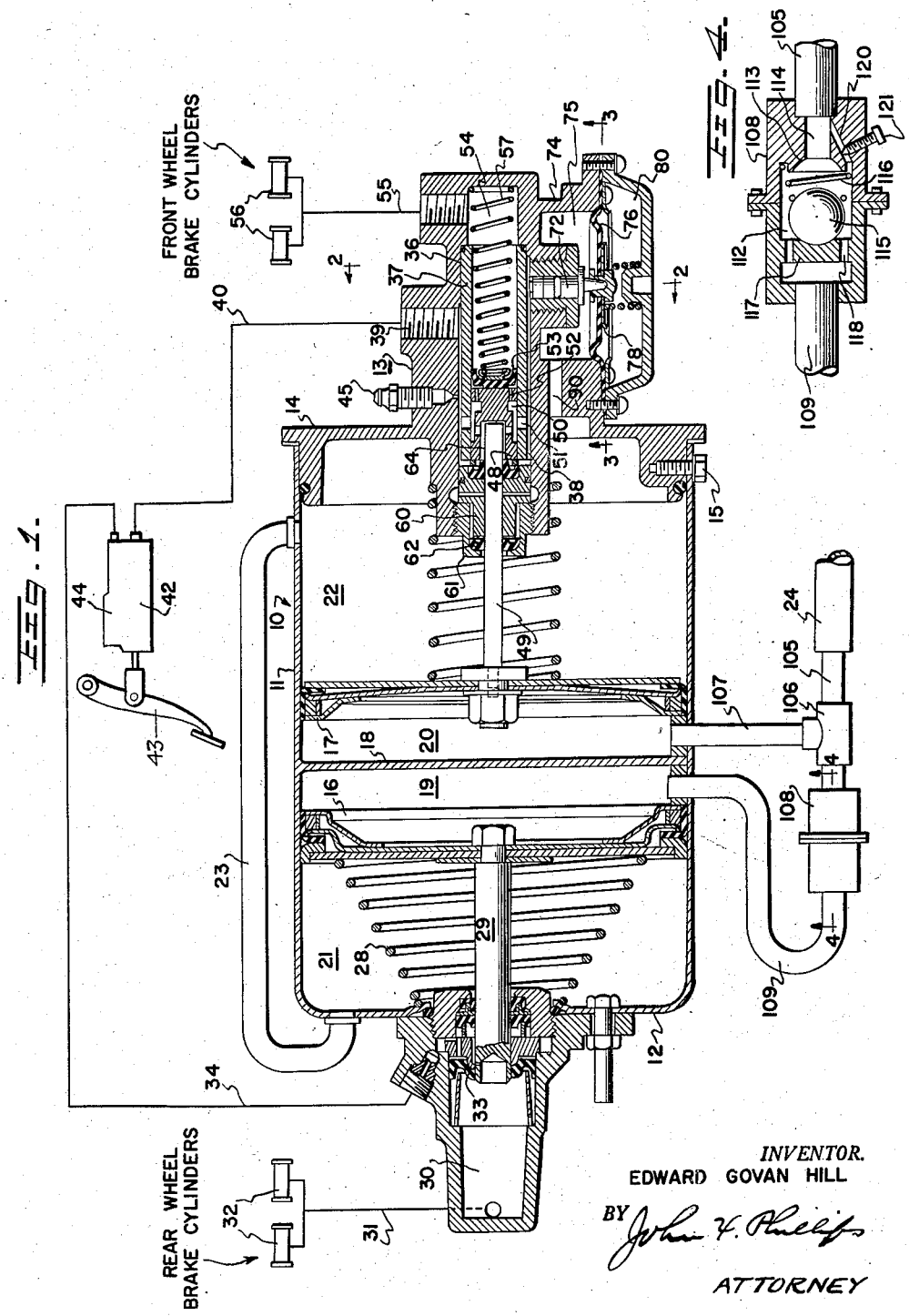
Figure 1 is an axial sectional view through the booster unit, parts being shown in elevation and parts being broken away, certain elements of the system being diagrammatically shown and the booster being shown as of the double-ended type.

In Figure 1, the single unit booster motor is indicated as a whole by the numeral 10 and comprises a cylinder 11 having a closed end 12. At the other end of the motor a preferably die-cast body 13 has a portion 14 thereof forming a head for the adjacent end of the motor cylinder, such head being connected to the cylinder as at 15.

The cylinder 11 is provided therewithin with a pair of pressure responsive units or pistons 16 and 17 between which is arranged a dividing wall 18 forming with the pistons a pair of variable pressure chambers 19 and 20. Between the pistons 16 and head 12 is formed a constant pressure chamber 21, and a similar chamber 22 is formed between the piston 17 and head 14. The chambers 21 and 22 are connected by a jumper line 23, thus equalizing pressures at all times in these chambers.

A valve mechanism to be described controls pressure in the chambers 19 and 20 through the medium of a main conduit 24 the connection of which to the chambers 19 and 20 is described in detail below. When pressures in the chambers 19, 20, 21 and 22 are equal, all of the parts will occupy the positions shown in Figure 1. When pressure is raised in the chambers 19 and 20, the pistons 16 and 17 will be moved away from each other, as will be apparent.

The piston 16 is biased to its off position by a return spring 28 and carries a plunger 29 movable into a master cylinder or hydraulic chamber 30 to displace fluid therefrom through conventional lines 31 to the rear brake cylinders 32 of the motor vehicle. The plunger 29 operates in suitable bearing and sealing means, indicated as a whole by the numeral 33, forming per se no part of the present invention. Such bearing and sealing means provide for the admission of replenishing fluid into the hydraulic chamber 30 through a line 34 further described below.

The cast body 13 is provided therein with a bore 36 in which is arranged a sleeve 37 surrounded between its ends with an annular space 38 having a hydraulic fluid inlet opening 39 connected to a hydraulic line 40. This line is connected to a conventional master cylinder 42 having an operating pedal 43 operating the usual master cylinder piston (not shown) for displacing fluid through the line 40. The master cylinder 42 also includes the usual reservoir 44 connected to the line 34 for supplying hydraulic fluid, when necessary, to the chamber 30. The annular space 38 is provided with a bleed plug 45 forming no part of the present invention.

The sleeve 37 forms a cylinder in which is operative a fluid displacing plunger 48 adapted to be actuated by a piston rod 49 connected to the piston 17. A space 50 around the plunger 48 communicates through a port 51 with the annular space 38 and, accordingly, receives fluid from the master cylinder 42. Such fluid can flow through ports 52 in the end of the plunger 48 and thence around the lip of a cup 53, seated against the plunger 48, and thus into a hydraulic chamber 54. This chamber communicates through lines 55 with the front wheel brake cylinders 56. The plunger 48 is biased to its normal off position in Figure 1 by a spring 57.

The piston rod 49 extends through a bearing 60 mounted in the cast body 13 and maintained in position by a nut 61 having a fluid seal 62 therein. The piston rod 49 extends into a recess 64 in the rear end of the plunger 48, which recess is open to communication with the space 50 and constitutes therewith a fluid receiving chamber, whereby fluid pressure in the recess 64, generated by the pedal 43, tends to assist the motor piston 17 in moving the plunger 48 to displace hydraulic fluid from the chamber 54.

Figure 2:
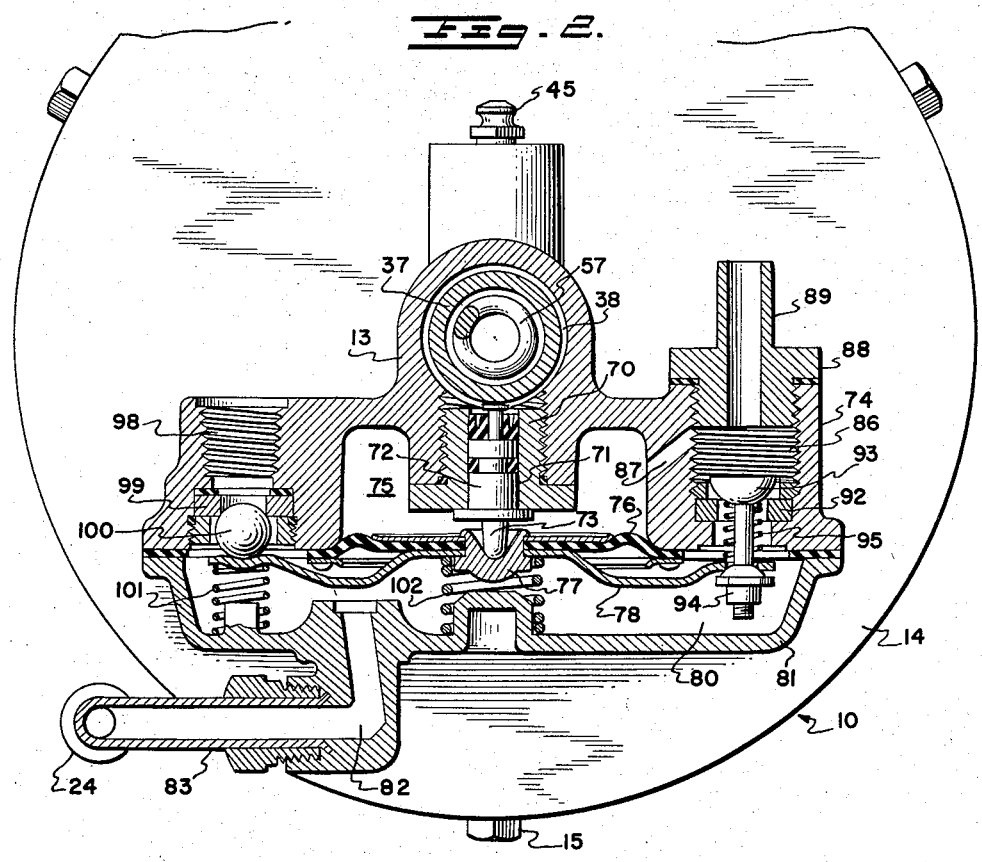
Figure 2 is an enlarged sectional view on line 2—2 of Figure 1.
Figure 3:
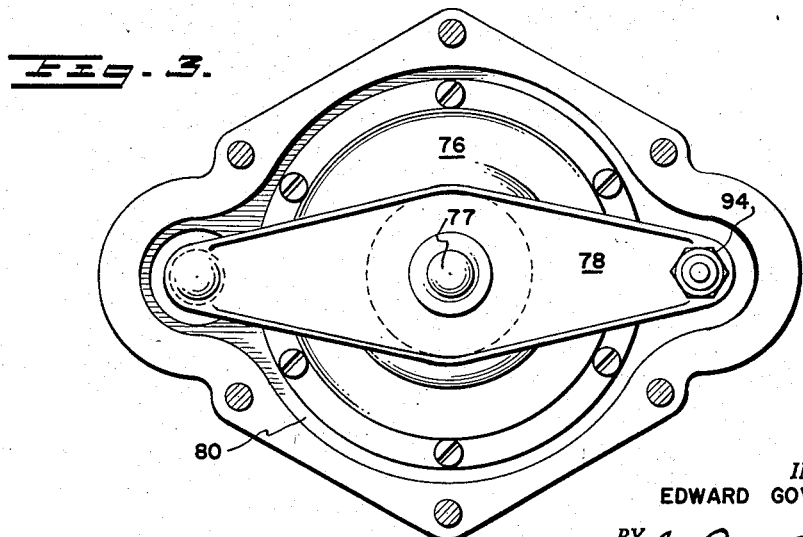
Figure 3 is a similar view on line 3—3 of Figure 1.

A suitable valve mechanism, forming per se no part of the present invention, is shown in detail in Figures 2 and 3. This valve mechanism is described and claimed in the copending application of Jeannot G. Ingres, Serial No. 455,647, filed September 13, 1954. It will become apparent that the present invention is not limited to the use of any particular type of motor control valve mechanism.

Referring to Figure 2, the numeral 70 designates a nut threaded into the body 13 and forming therein a cylinder 71 receiving a pressure operable plunger 72. The upper end of the cylinder 71 communicates with the annular space 38 and, accordingly, the plunger 72 is subject to pressures developed in the master cylinder 42 by pedal operation. The lower end of the plunger 72 is provided with an operating boss 73 for a purpose to be described.

The body 13 is provided with a depending annular portion 74 forming therewithin a vacuum chamber 75 sealed at the bottom thereof by a diaphragm 76. This diaphragm is carried by a thimble 77 having an upper axial recess receiving the boss 73. The thimble 77 is also secured to the central portion of a lever 78.

The lever 78 is arranged in control chamber 80 formed within a cap 81 secured to the bottom of the annular wall 74 of the body 13. The chamber 80 communicates through a passage 82 and elbow 83 with the conduit 24 (Figures 1 and 2).

Radially outwardly of the chamber 75 the body 13 is provided with a vacuum chamber 86 in fixed communication through a passage 87 with the chamber 75. A fitting 88 is threaded into the upper end of the chamber 86 and has an upstanding nipple 89 communicating through a suitable conduit (not shown) with a source of vacuum such as the intake manifold. It will be apparent that vacuum is always present in the chamber 75, and this chamber is in fixed communication through a passage 90 (Figure 1) with the motor chamber 22. This chamber, in turn, is in fixed communication with the motor chamber 21 through the jumper line 23.

In the bottom of the vacuum chamber 86 is arranged a valve seat 92 engageable by a hemispherical valve 93 the stem of which carries a nut 94 engageable beneath one end of the lever 78. A spring 95 maintains the valve 93 at its upward limit of movement with the hemispherical upper head of the nut 94 in engagement with the lever 78. The valve 93 is normally open as in Figure 2, in which case the chambers 86 and 80 communicate with each other and air will be exhausted through line 24 to maintain vacuum in the motor chambers 19 and 20 to vacuum-suspend the motor.

Diametrically opposite the vacuum chamber 86, the body 13 is provided with an air inlet 98 tapped for connection with an air cleaner (not shown). In the bottom of the air inlet 98 is arranged a valve seat 99 engageable by a ball valve 100, this valve seating upwardly and being normally closed as in Figure 2. The ball valve 100 engages the top face of the adjacent end of the lever 78, and the latter is urged upwardly by a spring 101. Centrally of its length, the lever 78 is urged upwardly by a compression spring 102, as shown in Figure 2.

The conduit 24 (Figure 1) has its end remote from the valve mechanism connected to a pipe 105 having a T 106 a branch of which is connected by a pipe 107 to the motor chamber 20. The run of the T 106 communicates with one end of a valve casing 108 and the other end of this casing is connected by a pipe 109 to the motor chamber 19.

The specific structure of the mechanism in the valve housing 108 makes no particular difference so long as the desired functioning of the valve mechanism is provided for the purpose further described below. Within the valve housing 108 is a valve chamber 112 at one end of which is a valve seat 113, and between this seat and the pipe 105 is a passage 114. A valve 115 in the chamber 112 is engageable under conditions to be described with the valve seat 113 and is urged away from such seat by a spring 116. A wall 117 at one end of the chamber 112 forms a stop member for the ball valve 115 and is apertured as at 118 for substantially unrestricted communication between the chamber 112 and the pipe 109. As viewed in Figure 1, the right-hand end of the mechanism represents the forward end of the vehicle and the left-hand end the rear of the vehicle, this being important in connection with the functioning of the valve 115 which is an inertia valve, as further described below.

The bypass passage 120 may communicate between the chamber 112 and passage 114 and may be controlled by a valve 121 to provide any degree of restriction of the passage 120 or to close this passage entirely, in accordance with the desired mode of operation of the brake mechanism.

Operation

The parts normally occupy the positions shown in Figures 1 and 2. When the brakes are to be applied, the operator depresses the pedal 43, thus displacing fluid through line 40, annular space 38, into the sleeve 37, past the sealing cup 53 into chamber 54, and thence through lines 55 to the front wheel brakes 56. When pressure is built up to a predetermined point between the plunger 48 and the wheel cylinders 56, the valve operating plunger 72 will be moved downwardly, thus effecting similar movement of the center point of the lever 78. This movement of the lever takes place against the pressure of the spring 102, and the air valve 100 will be held seated by the spring 101. Such movement of the lever 78, therefore, closes the vacuum valve 93 to disconnect the vacuum chamber 86 from the control chamber 80.

The valve lever 78 now fulcrums on the nut 94, and accordingly further downward movement of the plunger 72 will effect downward movement of the left-hand end of the lever 78 in Figure 2 to release the air valve 100 from engagement with its seat 99. Air now flows through inlet 98 into chamber 80, thence through pipe 24 and into the motor chambers 19 and 20. The flow of air through pipes 105 and 107 into the motor chambers 20 is always unrestricted. The flow of air through the valve housing 108 depends upon conditions described below. Assuming that an average stop is being made at an average rate of vehicle deceleration, the valve 115 (Figure 4) will remain in or close to its normal fully opened position, in which case air will flow into the chamber 19 as freely as into the chamber 20.

When air flows into the chambers 19 and 20 to energize the motor, the piston 16 effects movement of the plunger 29 to displace fluid from the chamber 30 into the rear wheel brake cylinders 32. The piston 17 moves to the right or forwardly and transmits movement to the plunger 48 to displace fluid from the chamber 54 into the front wheel cylinders.

As previously stated, one of the principal objects of the structure shown in the copending application referred to above (Ayers and Hill, Serial No. 474,804) is the provision of braking action for the front wheels which is generated by the booster motor plus any force which the operator can add through operation of the brake pedal. On the other hand, braking forces at the rear wheels are limited by differential pressures affecting the motor piston 16. Moreover, since fluid is displaced by operation of the pedal 43 into the front wheel brake lines to take up play between the brake shoes and the drums for the front wheels, application of the front wheel brakes will lead application of the rear brakes. The latter action can occur only after motor energization takes place.

In accordance with the operation of the mechanism as disclosed in copending application Serial No. 474,804, operation of the front wheel brakes leads operation of the rear brakes and no manual force can be added to generate pressure in the rear brake cylinders 32, thus materially reducing the tendency for the rear wheels to lock and slide. Under normal driving conditions it is practically impossible to so lock the front wheel brakes because of the high degree of traction maintained on account of the weight of the vehicle motor. Therefore, very substantially greater braking efforts can be exerted at the front wheels than at the rear wheels, and with the present mechanism, all of the force generated by the foot of the operator is added to the force of the piston 17 in applying the front wheel brakes.

Even with the highly advantageous operation provided by the mechanism disclosed and claimed in copending application Serial No. 474,804, it is still possible under emergency braking conditions to lock the rear wheels. This can and does occur prior to the braking of the front wheels to the maximum extent. Therefore, an operator usually will sacrifice braking effect by applying no further pressure to the brake pedal when the rear wheels lock and, in many instances, the driver will instinctively ease up on the brake pedal to release the rear wheels. This failure to take full advantage of the maximum braking provided at the front wheels can, of course, be disastrous.

The present mechanism is particularly intended to prevent the locking of the rear wheels under emergency braking conditions by preventing the full application of available braking forces to the rear wheels. This is done by taking advantage of the inertia of the vehicle under emergency stopping conditions if the rate of vehicle deceleration exceeds a predetermined point.

Assuming, for example, that a vehicle is traveling at a relatively high speed and an emergency arises which makes it desirable or necessary to stop the vehicle in the shortest possible travel, the operator will depress the pedal 43 to the maximum extent, usually instinctively and usually followed by the locking of the rear wheels. With the present device, however, the braking of the vehicle occurs first at the front wheel brakes because of the inherent characteristics as described above. Braking will have commenced, therefore, prior to energization of the booster motor. This braking, of course, is initially relatively slight. When the motor 10 becomes energized, the pistons 16 and 17 will simultaneously move rearwardly and forwardly respectively, the forward piston 17 becoming effective in its braking action ahead of the piston 16 because of the fact that the brake shoes of the front wheels will have been engaged with the drums prior to operation of the motor control valve mechanism. With the brake pedal 43 fully depressed, the maximum pedal assistance will be given to the motor piston 17 and there will be a rapid rate of vehicle deceleration. If this deceleration is above a predetermined rate, for example twelve feet per second, the inertia of the ball valve 115 (Figure 4) will carry this valve forwardly against the seat 113 to completely cut off the passage of air through the valve housing 108 except for what slow flow of air can take place through the restricted port 120. Thus the further building up of differential pressures affecting the motor piston 16 will be prevented or minimized, and while very helpful braking action will occur at the rear wheels, this action will be insufficient for the locking and skidding of the wheels. Thus the operator will be enabled to secure the maximum heavy braking effect provided for at the front wheels of the motor vehicle and he will not instinctively partially release the brake pedal 43 or arrest further movement of this brake pedal due to any instinctive action occurring through the locking of the rear wheels and the "screaming" of the tires on the road. The rate of vehicle deceleration at which the valve device in Figure 4 becomes effective is a simple matter of design and adjustment.

For example, the lighter the spring 116 in relation to the mass of the ball 115 the lower will be the deceleration rate at which the ball 115 will be seated. Moreover, the controlling of pressure in the motor chamber 19 for a given deceleration rate at which the ball 115 is effective can be controlled by adjusting the valve 121. Usually this valve will be nearly closed to provide for a very slow bleed of air through the passage 120. If desired, of course, the valve 121 can be completely closed or the passage 120 eliminated entirely, in which case the inertia of the ball 115 under conditions to which it is responsive will completely cut off the admission of air into the motor chamber 19 until after vehicle deceleration has taken place to a point where the spring 116, assisted by air pressure in the passage 114, is effective for unseating the valve 115.

It will be apparent, therefore, that the present invention provides for the application of maximum braking effort at the front wheels of the vehicle while minimizing the braking effect at the rear wheels below the point at which such wheels will lock under emergency braking conditions. The device, however, does not function to eliminate all braking action at the rear wheels since the inertia device can become effective only through vehicle deceleration and this occurs only after a predetermined degree of energization of the booster motor. Therefore the present system provides for taking advantage of the greatest possible rear wheel braking effect without the locking of the rear wheels and provides for front wheel braking effort limited solely by the maximum energization of the motor and the operator's ability to add pedal effort to the force of the piston 17.

The means for supplying fluid from the master cylinder 42 into the chamber 54 and thus to the front wheel cylinders, including the specific form of the plunger 48 and the cup 53, forms per se no part of the present invention but is disclosed and claimed in the copending application of David T. Ayers, Jr., Serial No. 455,509, filed September 13, 1954. There are other types of mechanisms in which a power operated plunger is valved or otherwise altered for the passage therethrough of pedal displaced hydraulic fluid into the brake lines.

In its broadest aspects, the present mechanism comprises the provision of a motor vehicle brake system wherein hydraulic fluid is supplied through separate lines to the front and rear wheel cylinders of a motor vehicle and to provide in cooperation with such system the means which is responsive to inertia occurring incident to rapid vehicle deceleration for limiting the application of the rear brakes below what otherwise would take place. Coupled with such system, the present invention provides a booster brake mechanism wherein the operator, through pedal pressure, assists in the application of the brakes but wherein all of such pedal assistance is directed to the application of the front brakes, thus providing a predetermined maximum rear brake application with no limits on the generation of braking effect at the front wheels except as the braking force is limited by the ability of the operator to assist in the application of the front wheel brakes.

It is to be understood that the form of the invention shown is to be taken as a preferred example of the same and that various changes may be made in the construction as do not depart from the scope of the appended claims.

I claim:

1. A booster brake mechanism for a motor vehicle having a pair of sets of wheels cylinders for operating the vehicle brakes, comprising a pair of hydraulic chambers each connected to one set of wheel cylinders, a plunger movable into each of said chambers to displace fluid therefrom, fluid pressure operated motor means comprising a pair of pressure movable elements each connected to one of said plungers and having a variable pressure chamber at the side of each piston remote from its associated plunger, a single control valve mechanism, separate fluid lines leading from said control valve mechanism to said variable pressure chambers, said valve mechanism normally connecting said fluid lines to a source of relatively low pressure and being operable for connecting such lines to a source of higher pressure, and a valve device arranged in one of said fluid lines between said valve mechanism and the variable pressure chamber associated with such fluid line, said valve device comprising a normally open valve element, a seat between said valve element and said valve mechanism, and means biasing said valve element away from said seat, said valve element being movable upon said predetermined rate of vehicle deceleration into engagement with said seat to close said one fluid line to prevent further increase in pressure in the variable pressure chamber to which said one fluid line is connected.

2. A mechanism according to claim 1 wherein the plunger operable by the pressure responsive unit connected to the variable pressure chamber to which the other fluid line is connected has a fluid receiving chamber at the end thereof opposite the associated hydraulic chamber, and a pedal operable master cylinder connected to said fluid receiving chamber and connected to operate said valve mechanism.

3. A booster brake mechanism for a motor vehicle having a pair of sets of wheel cylinders for operating the vehicle brakes comprising a pair of hydraulic chambers each connected to one set of wheel cylinders, a plunger movable into each of said chambers to displace fluid therefrom, a pair of fluid pressure motor units each having a pressure responsive element and a variable pressure chamber at one side thereof, the pressure responsive element of one motor unit being connected to one plunger and the pressure responsive element of the other motor unit being connected to the other plunger, a single control valve mechanism for said motor units, separate fluid lines leading from said control valve mechanism to said variable pressure chambers, said valve mechanism normally connecting said fluid lines to a source of relatively low pressure and being operable for connecting such lines to a source of higher pressure, a valve element in the fluid line leading to said one motor unit, a valve seat between said valve element and said valve mechanism, and means biasing said valve element to open position, said valve element being movable into engagement with said seat when the rate of vehicle decleration increases to a predetermined point to prevent the flow of pressure fluid from said valve mechanism into the variable pressure chamber of said one motor, said valve element being movable to open position by said biasing means when the rate of vehicle deceleration decreases.

4. A mechanism according to claim 3 wherein said valve seat opens toward the rear of the vehicle, said valve element comprising an inertia element movable forwardly into engagement with said seat when the rate of vehicle deceleration increases to said predetermined point.

5. A mechanism according to claim 3 provided with hydraulic pressure responsive means for operating said valve mechanism, said other plunger having a fluid receiving chamber at the end of such plunger opposite the associated hydraulic chamber, and a pedal operable master cylinder connected to said fluid receiving chamber and to said hydraulic pressure responsive means.

References Cited in the file of this patent

UNITED STATES PATENTS

| | | |
|---|---|---|
| 2,135,003 | Harrison | Nov. 1, 1938 |
| 2,136,706 | Ostrander | Nov. 15, 1938 |
| 2,182,463 | Beeston | Dec. 5, 1939 |
| 2,218,194 | Freeman | Oct. 15, 1940 |
| 2,241,191 | Freeman | May 6, 1941 |
| 2,242,297 | Freeman | May 20, 1941 |
| 2,353,755 | Price | July 18, 1944 |
| 2,402,344 | Price | June 18, 1946 |